United States Patent [19]
Turner et al.

[11] Patent Number: 5,911,231
[45] Date of Patent: Jun. 15, 1999

[54] UTILITY CARRIER FOR A CAR WASH

[75] Inventors: Barry S. Turner, Livonia; Thomas E. Weyandt, Northville, both of Mich.

[73] Assignee: Belanger, Inc., Northville, Mich.

[21] Appl. No.: 08/885,202

[22] Filed: Jun. 30, 1997

[51] Int. Cl.$^6$ ..................................................... B08B 3/02
[52] U.S. Cl. ............................. 134/123; 134/201; 134/45
[58] Field of Search ............................. 134/123, 45, 201; 15/DIG. 2

[56] References Cited

U.S. PATENT DOCUMENTS

| | | |
|---|---|---|
| Re. 23,294 | 11/1950 | Hopper et al. .............................. 134/94 |
| 2,648,342 | 8/1953 | Vani et al. ................................ 134/123 |
| 2,764,893 | 10/1956 | Falkenberg . |
| 3,072,131 | 1/1963 | Laurenzio . |
| 3,288,109 | 11/1966 | Smith, Jr. et al. ........................ 134/123 |
| 3,537,423 | 11/1970 | Burden et al. . |
| 3,543,774 | 12/1970 | Trasp . |
| 3,759,275 | 9/1973 | Walters . |
| 4,043,286 | 8/1977 | Doty . |
| 4,232,845 | 11/1980 | Turner . |
| 4,880,026 | 11/1989 | Ferre et al. . |
| 4,955,405 | 9/1990 | Glick et al. . |
| 5,148,570 | 9/1992 | Crotts . |
| 5,167,044 | 12/1992 | Belanger . |
| 5,177,825 | 1/1993 | Belanger . |
| 5,255,695 | 10/1993 | Downey . |
| 5,280,855 | 1/1994 | Rietsch, Jr. . |
| 5,325,559 | 7/1994 | Belanger . |
| 5,361,443 | 11/1994 | Belanger . |

FOREIGN PATENT DOCUMENTS

| | | |
|---|---|---|
| 512081 | 6/1952 | Belgium . |
| 766485 | 1/1957 | United Kingdom . |

Primary Examiner—Frankie L. Stinson
Attorney, Agent, or Firm—Young & Basile, P.C.

[57] ABSTRACT

A drive-through vehicle wash of the type including a plurality of gantries defining a tunnel through which the vehicle passes and including a plurality of longitudinally spaced work stations along the tunnel for performing respective operations associated with the washing of the vehicle. A utility carrier is provided to facilitate delivery of the various utility lines (such as soapy water, clear water, electric power, hydraulic power, and hot air) to the various work stations. The utility carrier comprises a ladder structure positioned above the gantries and a plurality of U-shaped brackets positioned on top of the gantries. The ladder structure has a closed loop configuration overlying the gantries and includes an entry section. Each utility line passes through the entry section and then passes over successive rungs of the loop ladder structure until arriving at the respective work station whereupon it passes downwardly between successive rungs for connection to the work station or passes upwardly and inwardly over the inboard stile of the ladder structure for connection to the work station. The utility carrier presents a neat, uncluttered appearance and avoids interference of the utility lines with the operation of the wash system and/or the passage of vehicles therethrough.

18 Claims, 4 Drawing Sheets

UTILITY CARRIER FOR A CAR WASH

FIELD OF THE INVENTION

This invention relates to vehicle wash systems and more particularly to vehicle wash systems of the drive-through type in which the vehicle is moved through a stationary wash system.

BACKGROUND OF THE INVENTION

Automatic vehicle washes generally fall into two broad categories. The first category comprises drive-through vehicle washes in which a vehicle is conveyed or drives through the wash along a longitudinal conveyor. The second category comprises rollover vehicle washes in which the vehicle remains stationary and the wash apparatus moves relative to the vehicle. Rollover vehicle washes have the advantage that they are very compact and are relatively inexpensive. Drive-through vehicle washes take significantly greater longitudinal space and tend to be more expensive, both from the standpoint of the equipment cost as well as the building and real estate costs associated with the additional space requirements. However, the drive-through systems offer superior speed and wash quality characteristics.

A myriad of drive-through vehicle wash systems have been proposed and successfully implemented. However, these drive-through systems tend to be cluttered and complicated by the necessity of routing one or more utility lines to each work station along the car wash.

SUMMARY OF THE INVENTION

This invention is directed to an improved vehicle car wash.

More specifically, this invention is directed to an improved vehicle car wash of the drive-through type.

Yet more specifically, this invention is directed to a drive-through vehicle wash which is simple and uncluttered, both in operation and in appearance.

The drive-through vehicle wash of the invention is of the type including a gantry frame structure defining an axial tunnel for drive-through passage of the vehicle along an axial path, a plurality of work stations at successive longitudinally spaced locations along the tunnel for performing respective operations associated with the washing of the vehicle, and means for delivering a plurality of utility lines selectively to the various work stations.

According to the invention, the means for delivering a plurality of utility lines to the various work stations comprises a ladder structure positioned on the frame structure and extending horizontally and axially above the path. With this arrangement, the utility lines for the various work stations may be readily and neatly delivered to the work stations along the ladder structure.

According to a further feature of the invention, the ladder structure includes a pair of parallel elongated stiles and a plurality of rungs extending between the stiles at space locations along the stiles and each utility line extends along the ladder structure between the stiles in overlying relation to successive rungs. With this arrangement utility lines may be readily routed between the stiles and above the rungs to the respective work station whereafter the line may be routed downwardly from the ladder structure for connection to the respective work station.

According to a further feature of the invention, the gantry frame structure comprises a plurality of longitudinally spaced gantries each having spaced post members positioned at opposite sides of the path and a central bridge member spanning the post members in overlying relation to the path, and the ladder structure includes a longitudinal ladder structure section extending along one longitudinal side of the gantry frame structure between successive gantries. This basic gantry/ladder structure configuration provides a simple and effective structure for routing utility lines to the various stations.

According to a further feature of the invention, the ladder structure includes a longitudinal ladder structure section extending along each longitudinal side of the frame structure. The provision of parallel longitudinal ladder structures along each side of the frame structure allows the delivery of utility lines to each work station at either side of the work station.

In the disclosed embodiment of the invention, a cross-ladder structure section extends transversely between the longitudinal ladder structure sections at each end of the longitudinal ladder structure sections to form a closed loop ladder structure overlying the gantry frame structure and the ladder structure is supported on the gantry frame structure by a plurality of spaced brackets extending upwardly from the gantry frame structure.

DESCRIPTION OF THE PREFERRED EMBODIMENT OF THE INVENTION

Figure 1:
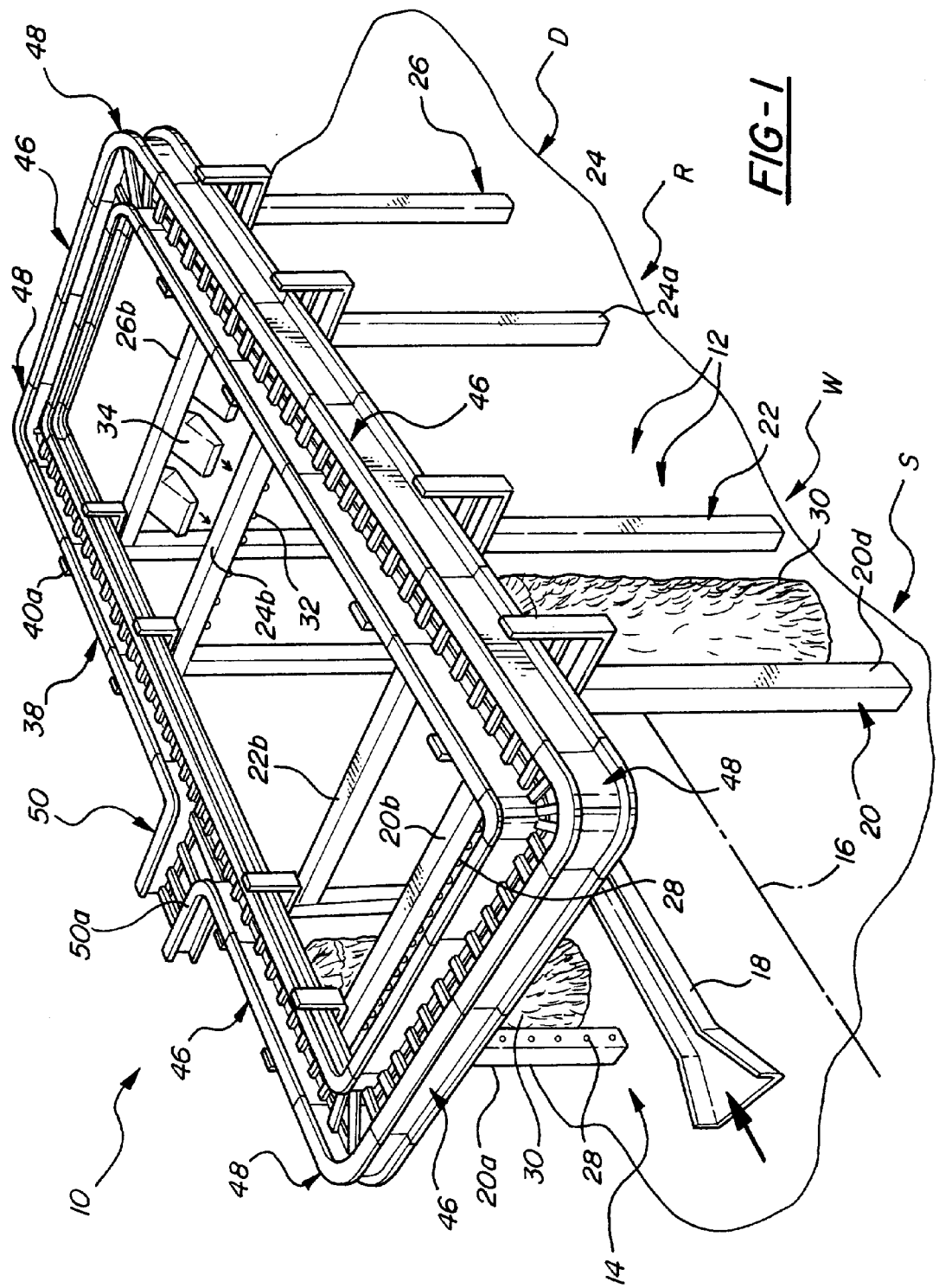
FIG. 1 is a perspective somewhat schematic view of a vehicle drive-through wash according to the invention.

The drive-through vehicle wash 10 (FIG. 1) will be understood to be merely representative of a multitude of different types and configurations of drive-through vehicle wash systems and will further be understood to be, in all respects, generally schematic.

Vehicle wash 10, broadly considered, includes a gantry frame structure 12 defining an axial tunnel 14 for drive-through passage of a vehicle along an axial path 16; an in-floor conveyor system 18 for moving vehicles in known manner through tunnel 14 along axial path 16; and a plurality of longitudinally spaced work stations along the tunnel. Specifically, and by way of example only, the work stations may include a soap station S, a wash station W, a rinse station R, and a dry station D.

Soap station S is provided proximate a first gantry 20 including a post 20a on either side of the vehicle path and a bridge member 20b spanning the post members; wash station W may be provided proximate a second longitudinally spaced gantry 22 including upright posts 22a and a bridge member 22b; rinse station R may be provided proximate a third longitudinally spaced gantry 24 including post members 24a at opposite sides of the vehicle path and a bridge member 24b; and dry station D may be provided proximate a fourth longitudinally spaced gantry 26 including post members 26a on either side of the vehicle path and a bridge member 26b.

Soap station S may include, in known manner, a plurality of soap nozzles 28 provided on the posts and bridge of gantry 20 to soap a vehicle entering tunnel 14.

Wash station W may include brushes 30 positioned proximate gantry 22, on opposite sides of the vehicle path, with each brush mounted for rotation about a vertical axis.

Rinse station R may include nozzles 32 provided on gantry 24 and operative to spray a soaped and washed vehicle passing therethrough.

Dry station D may include a plurality of transversely spaced hot air dryers 34 positioned proximate the bridge 26b of gantry 26 and operative to direct a stream of hot air against the soaped, washed and rinsed vehicle passing therebeneath.

It will be understood that it is necessary to direct a soapy fluid to the nozzles 28 of soap station S, provide electric power to rotate the brushes 30 at wash station W; provide clear water to the nozzles 32 of the rinse station R; and provide heated pressurized air to the blowers 34 of dry station D.

According to the invention, a utility carrier is provided to facilitate the delivery of utilities to the various work stations in an efficient and uncluttered manner.

The utility carrier of the invention comprises a plurality of bracket assemblies 36 and a ladder structure 38.

Each bracket assembly 36 includes a bracket structure 40 and a pair of clamps 42.

Figure 4:
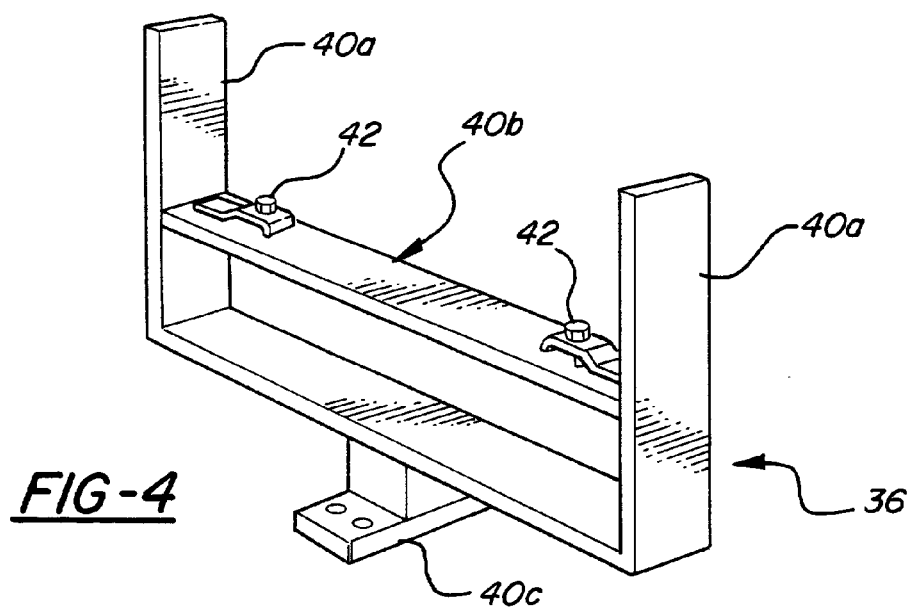
Figure 6:
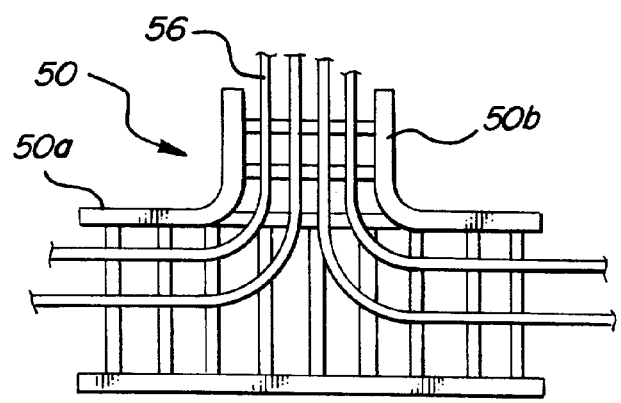
Figure 5:
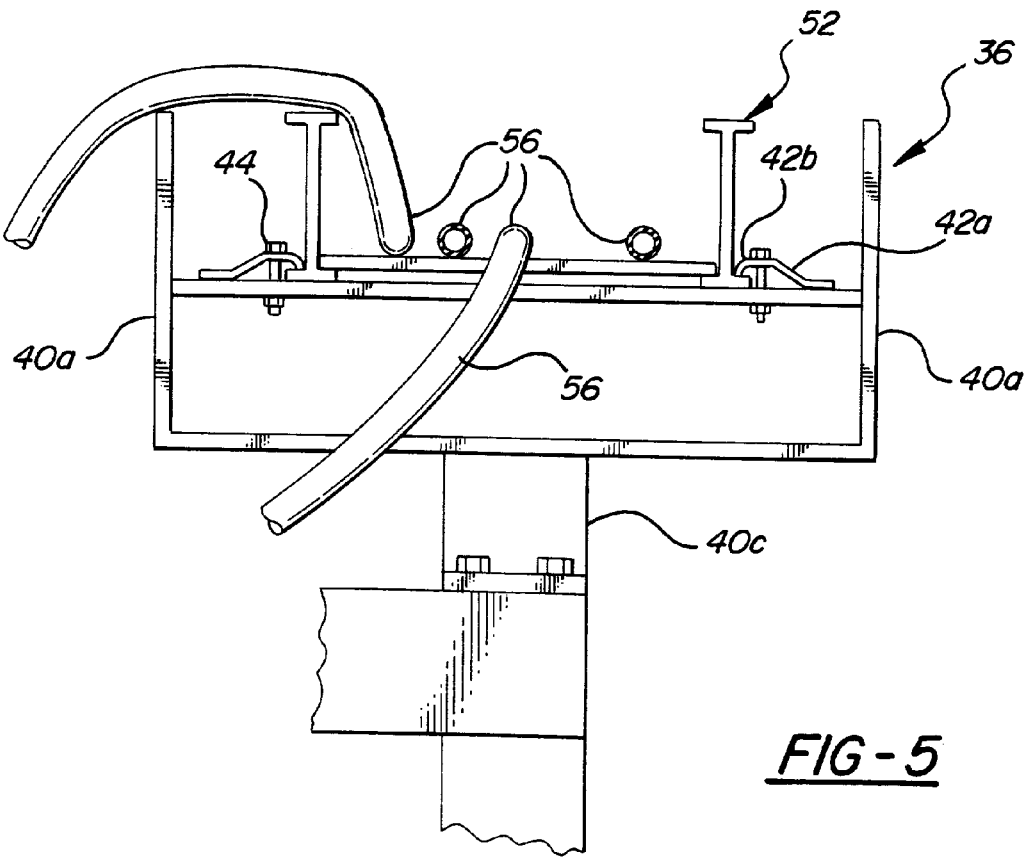
Figure 7:
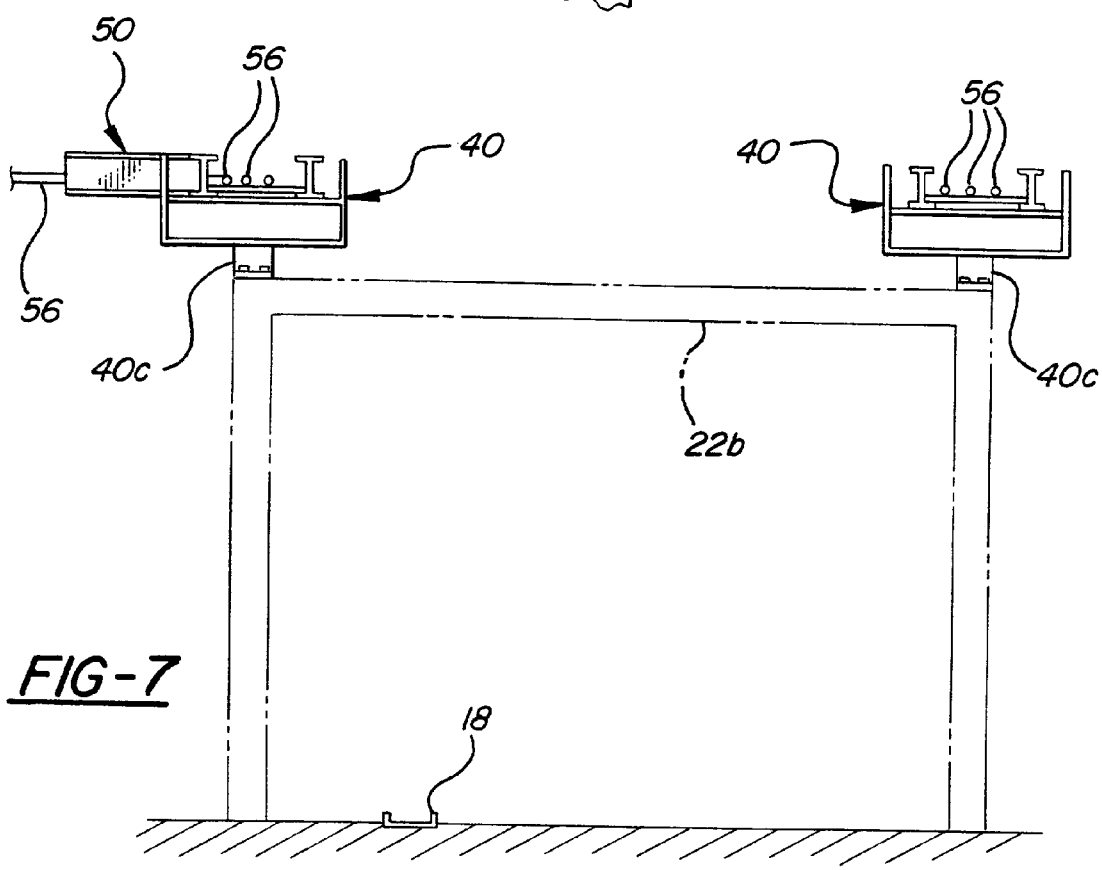
FIG. 7 is a schematic elevational view of the vehicle wash.

Each bracket structure 40 (FIGS. 4 and 5) has an upwardly opening configuration including opposite upright members 40a, a base member 40b, and a mounting portion 40c extending downwardly from base portion 40b.

Clamps 42 are positioned at opposite ends of base member 40b proximate a respective upright portion 40a. Each clamp includes a plate member 42a defining a clamping tip 42b and a bolt assembly 44 coacting with an aperture in each plate member 42a to secure the respective plate members 42a to base 40b.

Bracket assemblies 36 are secured to gantry structure 12 at longitudinally spaced locations along each side of the gantry structure. Preferably, and as shown, each bracket assembly is positioned above a post member of a respective gantry so as to form a vertical extension of the post member, and suitable fasteners pass through apertures 40d in mounting portions 40c to secure the respective bracket assembly to the gantry structure with the cradle defined by the U-shaped bracket extending generally transverse to vehicle path or axis 16.

Figure 2:
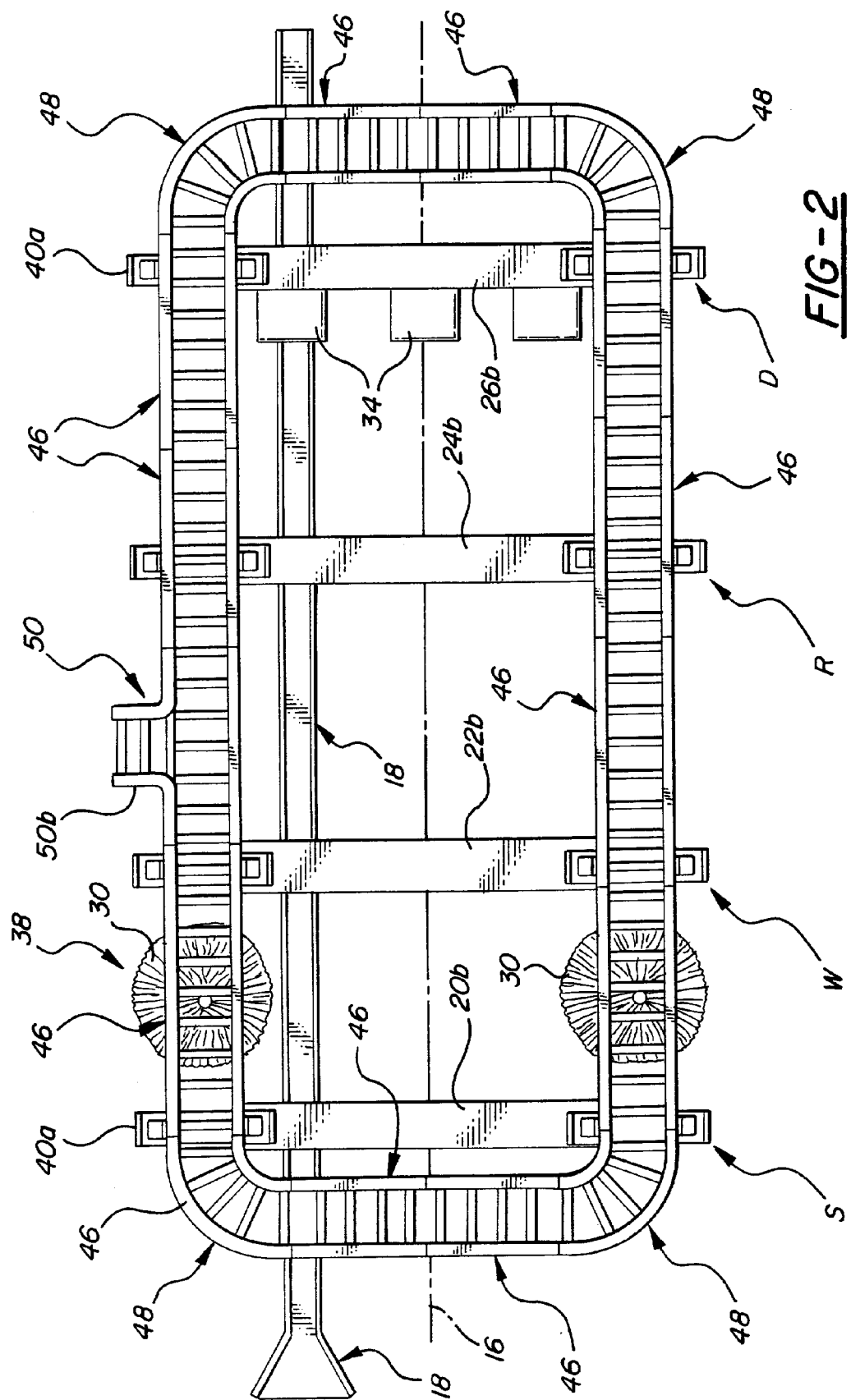
FIG. 2 is a plan view of the invention vehicle wash.
Figure 3:
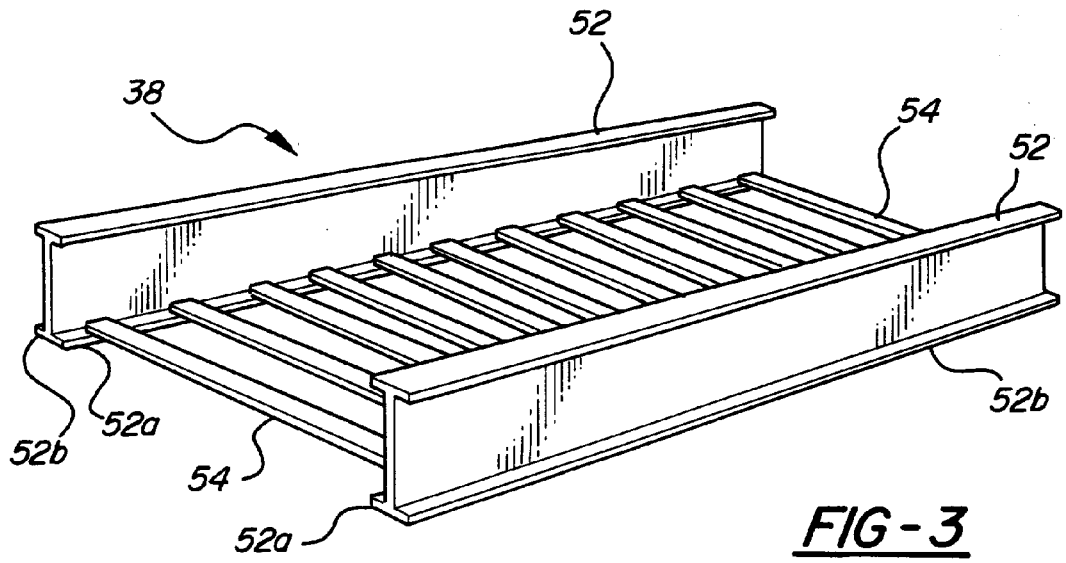
FIGS. 3, 4, 5, and 6 are fragmentary views showing various details of the vehicle wash.

Ladder structure 38 (FIGS. 1, 2 and 3) is a composite structure formed of individual, joined together ladder sections, including straight sections 46, curved sections 48, and at least one entry section 50.

Each ladder section includes a pair of elongated parallel stiles 52 and a plurality of slats or rungs 54 extending transversely between the stiles to form a ladder configuration. Each stile has I-beam cross-sectional configuration defining an inboard lower flange portion 52a to which the rungs 54 are suitably secured as by welding. The ladder sections have a width allowing the section to pass between the uprights 40a of the bracket assemblies so that the ladder sections may be cradled by the bracket assemblies with the lower flanges of the stiles resting on the base member 40b of the bracket assemblies.

The stiles 52 of the curved ladder sections 48 have an arcuate configuration and the slats 54 of the curved sections are arranged in a radial array with respect to the stiles. Entry section 50 has a T-configuration including a main body portion 50a and an entry portion 50b.

The various ladder sections are suitably secured together end-to-end to form a closed loop structure (FIG. 2) positioned in generally overlying relation to the gantry structure. Individual sections of the ladder structure pass through and are cradled by the various bracket assemblies upstanding from the various gantries, and the various ladder sections cradled between the bracket assemblies are fixedly secured to the respective bracket assemblies by clamps 42. Specifically, the clamping tips 42b of clamp plates 42a are engaged with the outboard lower flanges 52b of the respective ladder structure stiles so as to press the ladder structures downwardly against the bracket base members 46b in response to tightening of bolt assemblies 44.

Entry section 50 is positioned between two straight sections 46 along one longitudinal side edge of the ladder structure with the main body entry section portion 50a in alignment with the adjacent straight ladder sections 46 and the entry section 50b extending outwardly in a direction generally normal to axis 16.

In use, the various utility lines 56 required to facilitate the operation of the various work stations are routed from an external location along and on top of the rungs of entry section 50b and are thereafter routed along and on top of the rungs of the main body of the ladder loop until they reach their respective work station whereupon the line may be routed downwardly between successive rungs for connection to the work station or routed upwardly over the inboard stile of the ladder structure for connection to the work station.

As previously indicated, the lines may carry soapy water, electric power, pressurized hydraulic fluid, clear water, or pressurized hot air. The closed loop configuration of the ladder structure allows utility lines to be routed to both sides of each station so that there is no need for utility lines to span the space between the longitudinal portions of the ladder structure. For example, a soap line may be routed to each side of soap station S; an electric or hydraulic power line may be routed to each side of wash station W to power brushes 30; and a clear water line may be routed to each side of rinse station R; and hot air may be routed to each side of dry station D. Each line enters at the entry section 44 and passes neatly and unobtrusively around the loop ladder structure to its desired location whereafter the line may be passed downwardly through successive rungs or passed upwardly over the inboard stile for connection to the respective station. The utility lines are thus essentially out of sight so as to present an uncluttered appearance, and are out of the way of operators of the wash system and of vehicles passing through the wash system.

Whereas a preferred embodiment of the wash system has been illustrated and described in detail it will be apparent that various changes may be made in the disclosed embodiment. For example, although a complete closed loop ladder structure has been illustrated, in some installations it may be desirable to provide a ladder structure extending only along one longitudinal side of the gantry structure.

What is claimed is:

1. A drive-through vehicle wash including a gantry frame structure defining an axial tunnel for drive-through passage of a vehicle along an axial path, a plurality of work stations at successive longitudinally spaced locations along the tunnel for performing respective operations associated with the washing of the vehicle, and means for delivering a plurality of utility lines, selectively, to the various work stations, characterized in that:

the means for delivering utility lines comprises a ladder structure positioned on the frame structure and extending horizontally and axially above the path, the ladder structure comprising parallel longitudinally extending stiles and a plurality of rungs extending laterally between the stiles at spaced locations, whereby utility lines may be routed along and on top of the rungs and between the stiles to respective work stations whereupon the lines may pass downwardly between successive rungs for connection to the respective work stations.

2. A drive-through vehicle wash according to claim 1 wherein the ladder structure is positioned above the frame structure.

3. A drive-through vehicle wash according to claim 2 wherein the ladder structure includes a longitudinal ladder structure section extending along one longitudinal side of the frame structure between successive work stations.

4. A drive-through vehicle wash according to claim 2 wherein the ladder structure includes a longitudinal ladder structure section extending along each longitudinal side of the frame structure.

5. A drive-through vehicle wash according to claim 4 wherein the ladder structure further includes a cross-ladder structure section extending transversely between the longitudinal ladder structure sections.

6. A drive-through vehicle wash comprising:
a gantry frame structure defining an axial tunnel for drive-through passage of a vehicle along an axial path;
conveyor means for moving the vehicle through the tunnel along the path;
a plurality of longitudinally spaced work stations along the tunnel structure for performing respective operations associated with the washing of the vehicle;
a utility carrier including a ladder structure positioned on the frame structure and extending horizontally and axially above the path, the ladder structure comprising parallel longitudinally extending stiles and a plurality of rungs extending laterally between the stiles at spaced locations; and
a plurality of utility lines extending along and on top of the rungs between the stiles with at least certain of said lines extending downwardly between successive rungs for connection to the respective work station whereby to deliver electricity or a selected fluid to that work station.

7. A drive-through vehicle wash according to claim 6 wherein the utility carrier further includes a plurality of brackets upstanding from the gantry frame structure and supporting the ladder structure.

8. A drive-through vehicle wash comprising:
a gantry frame structure defining an axial tunnel for drive-through passage of a vehicle along an axial path;
conveyor means for moving the vehicle through the tunnel along the path;
a plurality of longitudinally spaced work stations along the tunnel structure for performing respective operations associated with the washing of the vehicle;
a utility carrier including a ladder structure positioned on the frame structure and extending horizontally and axially above the path; and
a plurality of utility lines extending along and above the ladder structure with each line terminating at the respective work station whereby to deliver electricity or a selected fluid to that work station;
the gantry frame structure comprising a plurality of longitudinally spaced gantries each having spaced post members positioned at opposite sides of the path and a central bridge member spanning the post members in overlying relation to the paths;
the ladder structure including a longitudinal ladder structure section extending along one longitudinal side of the gantry frame structure between successive gantries.

9. A drive-through vehicle wash according to claim 8 wherein the ladder structure includes a longitudinal ladder structure section extending along each longitudinal side of the frame structure.

10. A drive-through vehicle wash according to claim 9 wherein the ladder structure further includes a cross-ladder structure section extending traversely between the longitudinal ladder structure sections proximate each end of the longitudinal ladder structure sections so as to coact with the longitudinal ladder structure sections to form a closed loop.

11. A drive-through vehicle wash according to claim 10 wherein:
each ladder structure section includes a pair of parallel elongated stiles and a plurality of rungs extending between the stiles at spaced locations along the stiles; and
at least certain of the utility lines extend along the ladder structure in overlying relation to successive rungs and thereafter extend downwardly from the ladder structure for connection to a respective work station.

12. For use with a drive-through vehicle wash of the type including a gantry frame structure defining an axial tunnel for drive-through passage of the vehicle along an axial path and a plurality of work stations at successive longitudinally spaced locations along the tunnel for performing respective operations associated with the washing of the vehicle, a utility carrier comprising:
a ladder structure for supporting utility lines, the ladder structure including a pair of parallel elongated stiles and a plurality of rungs extending laterally between the stiles at spaced locations and defining downwardly opening spaces therebetween; and
bracket means for supporting the ladder structure on the gantry frame structure in a position extending horizontally and axially above the path, whereby utility lines may be routed along and on top of the rungs and routed downwardly through respective downwardly opening spaces for connection to respective work stations.

13. A utility carrier according to claim 12 wherein the bracket means supports the ladder structure above the frame structure.

14. A utility carrier according to claim 13 wherein the ladder structure includes a longitudinal ladder structure section adapted to extend along one longitudinal side of the frame structure between successive work stations.

15. A utility carrier according to claim 13 wherein the ladder structure includes a longitudinal ladder structure section adapted to extend along each longitudinal side of the frame structure.

16. A utility carrier according to claim 15 wherein the ladder structure further includes a cross-ladder structure section extending traversely between the longitudinal ladder structure sections.

17. A drive-through vehicle wash comprising:
a gantry frame structure defining an axial tunnel for drive-through passage of a vehicle along an axial path;
conveyor means for moving the vehicle through the tunnel along the path;

a plurality of longitudinally spaced work stations along the tunnel structure for performing respective operations associated with the washing of the vehicle;

a utility carrier including a ladder structure positioned on the frame structure and extending horizontally and axially above the path; and a plurality of utility lines extending along and above the ladder structure with each line terminating at the respective work station whereby to deliver electricity or a selected fluid to that work station;

the utility carrier further including a plurality of brackets upstanding from the gantry frame structure and supporting the ladder structure;

the gantry frame structure including a plurality of longitudinally spaced gantries each including spaced post members positioned at opposite sides of the path and a central bridge member spanning the post members in overlying relation to the path;

the brackets being positioned generally above and in vertical alignment with the respective post members.

18. A drive-through vehicle wash according to claim 17 wherein each bracket has an upwardly opening U-shaped configuration and cradles the ladder structure.

* * * * *